United States Patent Office 3,630,866
Patented Dec. 28, 1971

3,630,866

CHEMICAL REACTION SYSTEM USING ULTRA HIGH FREQUENCY SONIC ENERGY

Arnold H. Pelofsky, East Brunswick, N.J., assignor to Cities Service Oil Company, Tulsa, Okla.

No Drawing. Filed July 28, 1969, Ser. No. 845,577
Int. Cl. B01j *1/12;* C07c *3/24*
U.S. Cl. 204—157.1 7 Claims

ABSTRACT OF THE DISCLOSURE

Chemical reactions, especially intra-molecular reactions, are activated by subjecting fluid reactant to ultrasonic energy in the frequency range of between about $1\times10^{10}$ and about $1\times10^{15}$ hertz. This is preferably accomplished by passing fluid reactant within about 2 microns of a thin layer of piezoelectric transducer material while driving said transducer material with electromagnetic radiation in the frequency range between about $1\times10^{10}$ and about $1\times10^{15}$ hertz. The thickness of the transducer material is usually between 0.5 and 10 microns.

It has been suggested previously that chemical reactions might be activated or enhanced by the use of ultrasonic energy. The use of piezoelectric crystals driven by conventional electrical voltages to activate inter-molecular chemical reactions in fluids has been suggested. These crystals can be made to resonate at frequencies up to about $1\times10^{9}$ hertz. Such frequencies are sufficient to promote certain inter-molecular reactions, but are not believed sufficient to rupture molecular bonds or to activate intra-molecular reactions.

The present invention utilizes ultrasonic energy in the frequency range between about $1\times10^{10}$ and about $1\times10^{15}$ hertz to activate chemical reactions. This is preferably done by passing fluid reactant comprising one or more feed materials in close contact with a thin layer of piezoelectric transducer material while driving the transducer material with electromagnetic radiation in the frequency range between about $1\times10^{10}$ and about $1\times10^{15}$ hertz.

Use of ultrasonic energy in the frequency range between about $1\times10^{10}$ and about $1\times10^{15}$ hertz as contemplated by the present invention for treatment of chemical reactant results, especially in liquid reactant, in extremely short wave lengths of the same order of magnitude as intramolecular bond lengths. Typical wave lengths in liquid reactant are frequently between about 1 and about 10 Angstrom units with wave lengths on the order of 5 Angstrom being most common. Typical wave lengths in gaseous reactants will usually be somewhat shorter due to the lower velocities of sound in such reactants. Energy of such wave lengths is considerably more effective than energy of longer wave lengths in activating intramolecular reactions such as polymerization, de-polymerization, isomerization, alkylation, disproportionation and dehydrogenation.

At the frequencies preferred for practicing the present invention, less ultrasonic energy is generally needed to effect intra-molecular bonds and thereby activate intramolecular reactions such as those mentioned above than would be necessary to activate inter-molecular reactions. When activating intra-molecular reactions in accordance with a preferred embodiment of the invention, it is usually necessary to subject the reactant to between about $10^{-15}$ and about $10^{-30}$ kilowatt hours of energy per molecule of reactant. The exact power requirements will, of course, vary depending upon the reactant and the specific reaction desired. Because the effectiveness of the extremely high frequency sonic energy used in practicing the invention attenuates rapidly with distance, it is generally necessary to pass the reactant within about 2 microns of the transducer material in order to impart the desired energy into the reactant. When this is done, an energy output between about 0.01 and about 0.1 watt per square centimeter of transducer surface is generally sufficient to activate the desired reactions. For convenience, streams or films of fluid reactant are frequently passed between surfaces coated with transducer material and in such cases, the surfaces may be as much as 4 microns apart for best results.

In general, any surface coated with a thin layer of piezoelectric material will be suitable for practicing the present invention. The layer of piezoelectric material should be between about 0.5 and about 10 microns in thickness to produce the desired frequency range of ultrasonic energy. Suitable piezoelectric materials include, for instance, cadmium sulfide, cadmium selenide, cadmium telluride, barium zirconate and mixtures of barium zirconate with barium titanate. These or other piezoelectric transducer materials are preferably deposited in thin films on suitable base materials such as metal for use in accordance with the invention.

As mentioned above, electromagnetic radiation is the preferred method for driving piezoelectric transducer materials in practicing the invention. Due to the relatively thin layer of transducer material used and the generally fragile nature of such material, electromagnetic radiation rather than direct application of electrical current is preferred to drive the transducer material. Microwave radiation is preferred for this purpose although other forms of electromagnetic radiation such as laser radiation may be used.

The exact method employed in subjecting the transducer material to the driving energy is not considered a critical part of the invention, but in many instances application of microwave radiation to the transducer material by means of wave guides will be preferred. Alternatively, the transducer material may be placed in a microwave cavity of conventional design adapted to provide microwave radiation at the desired driving frequency. The use of wave guides, microwave cavities, etc. to introduce microwave radiation to desired areas is well known to those skilled in such arts and will not be described in detail here.

While any suitable arrangement of surfaces coated with or comprising thin layers of transducer piezoelectric material may be used in practicing the invention, a particularly preferred form is conventional etched disk filters such as are in commercial use for removing particles as small as one micron in size from fluid streams. Suitable etched disk filters are manufactured for instance by Vacco Valve Company of South El Monte, Calif. To adapt such filters for use in practicing the present invention, it is necessary that the etched disks be coated with appropriate thicknesses of piezoelectric transducer material. The disks or the whole filter may then be subjected to suitable driving frequencies such as by the use of microwave equipment as described above.

Due to the almost instantaneous nature of intramolecular reactions, residence time of reactant material in close proximity to the piezoelectric transducer surface as described above is not a critical factor in practicing the preferred embodiment of the invention in which intramolecular reactions are activated. Practical considerations such as ability to move reactant material past and in close proximity to transducer surfaces rather than theoretical requirements usually determine the minimum time during which reactant is subjected to the desired frequencies of ultrasonic energy in practicing the invention.

As a specific example of use of the present invention in activating intra-molecular reactions, normal butane is dehydrogenated to a mixture of butenes by passing it through a conventional etched disk filter. The disks are coated with cadmium sulfide to a thickness of 2 microns and the coated disk surfaces are spaced 2 microns apart. Microwave radiation is conducted to the disks through wave guides at a frequency of $1\times10^{10}$ hertz thereby driving the piezoelectric transducer material at approximately the same frequency to subject the butane to ultrasonic energy at a frequency of $1\times10^{10}$ hertz at a wave length of about $2\times10^{-6}$ centimeters. In this example, the normal butane is subjected to an average of about $4\times10^{-24}$ watt hours of energy per molecule of butane. As a result of this treatment, more than 70 percent of the normal butane is converted to butenes.

Other suitable examples of the use of the present invention in activating intra-molecular reactions include the conversion of 2,2,5 trimethylhexane to mixed xylenes and the conversion of 2,2,5 tri-methylhexane to isopropyl benzene. Activation of reactions in accordance with the invention is not dependent upon particular temperature or pressure conditions. Temperature and pressure are generally limited by the physical characteristics of the piezoelectric transducer material and the reactant material rather than by chemical considerations.

While the invention has been described above with respect to certain preferred embodiments thereof, it will be understood by those skilled in the art that various changes and modifications may be made without departing from the spirit and scope of the invention.

I claim:

1. The process for activating intra-molecular chemical reactions which comprises subjecting a fluid chemical reactant to ultrasonic energy in the frequency range of between about $1\times10^{10}$ and about $1\times10^{15}$ hertz by passing such reactant within about 2 microns of a thin layer of piezoelectric transducer material between about 0.5 and about 10 microns thick while such transducer material is emitting ultrasonic energy in such frequency range.

2. The process of claim 1 in which the reactant is liquid.

3. The process of claim 1 in which the reactant is gaseous.

4. The process of claim 1 in which the transducer material is driven by electromagnetic radiation in the frequency range of between about $1\times10^{10}$ and about $1\times10^{15}$ hertz.

5. The process of claim 4 in which the reactant is passed between closely spaced surfaces coated with the transducer material.

6. The process of claim 5 in which the reactant is liquid.

7. The process of claim 5 in which the reactant is gaseous.

References Cited

UNITED STATES PATENTS 3,184,400 5/1965 Magnus ------------ 204—158

FOREIGN PATENTS 563,539 9/1958 Canada ------------ 204—157

HOWARD S. WILLIAMS, Primary Examiner

U.S. Cl. X.R.

204—158, 162